T. J. CORNING.
BALING PRESS, OR HAY PACKER.
No. 175,553. Patented April 4, 1876.
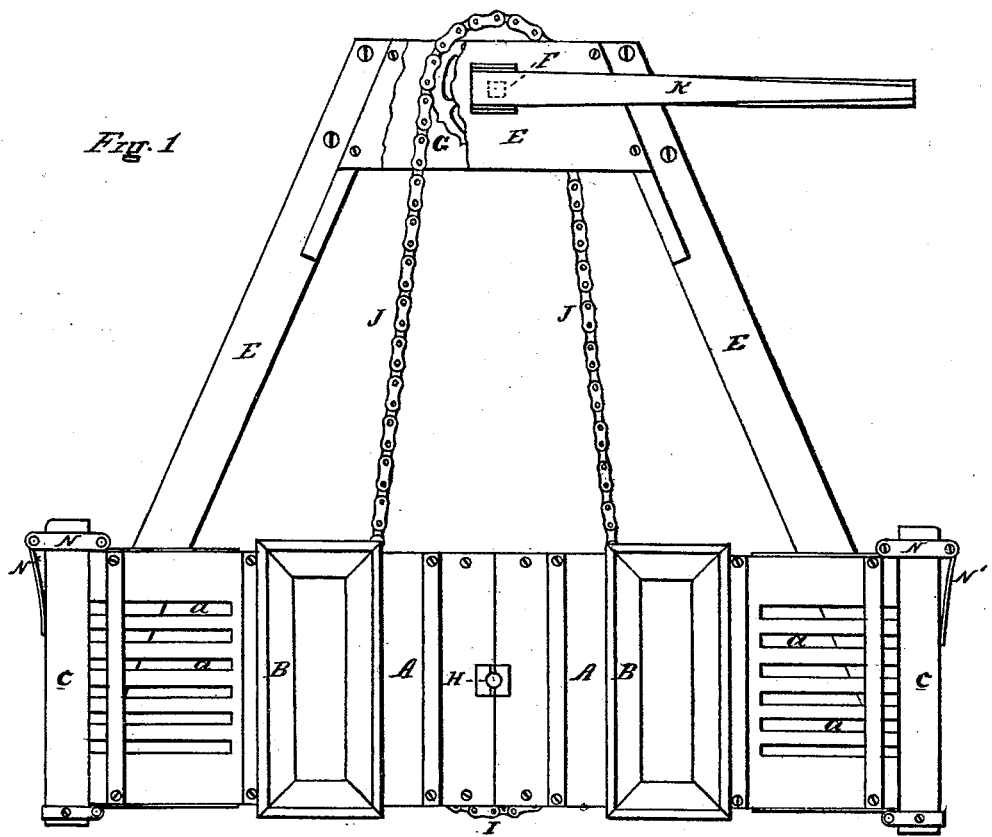
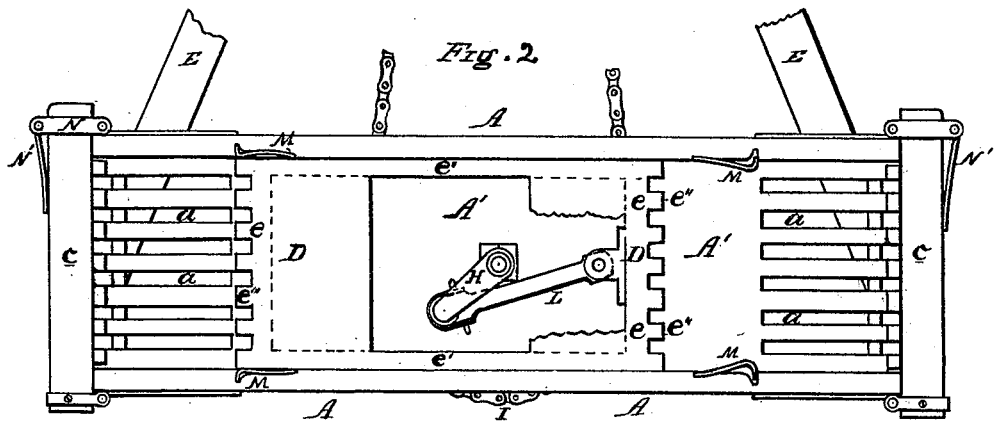

2 Sheets—Sheet 2.
T. J. CORNING.
BALING PRESS, OR HAY PACKER.
No. 175,553. Patented April 4, 1876.
Fig. 3
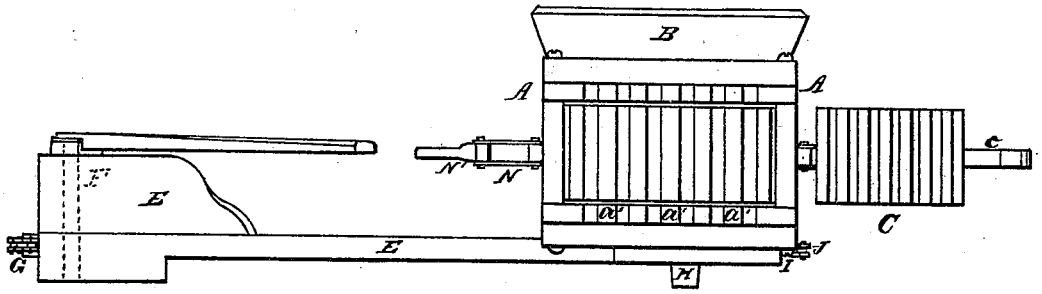
Fig. 4
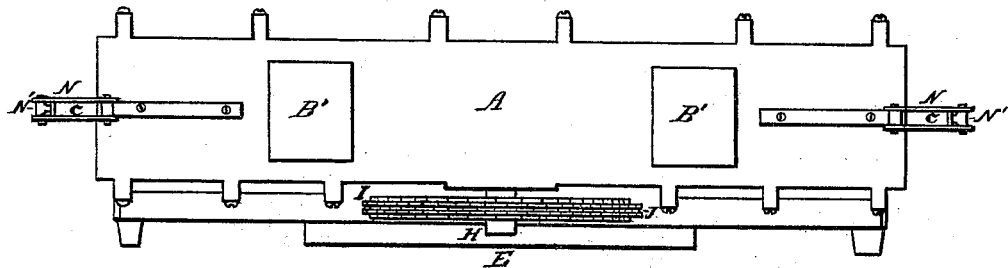
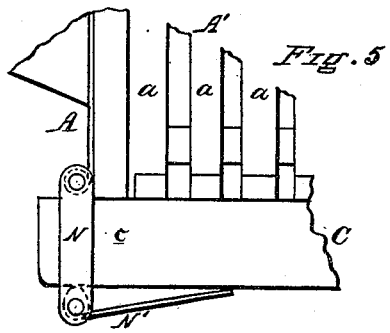
Fig. 5
WITNESSES
INVENTOR.
Thomas J. Corning
By Gridley & Warner
attys.

UNITED STATES PATENT OFFICE.

THOMAS J. CORNING, OF MONROE, WISCONSIN.

IMPROVEMENT IN BALING-PRESSES OR HAY-PACKERS.

Specification forming part of Letters Patent No. 175,553, dated April 4, 1876; application filed May 3, 1875.

*To all whom it may concern:*

Be it known that I, THOMAS J. CORNING, of Monroe, in the county of Green and State of Wisconsin, have invented certain new and useful Improvements in Baling-Presses or Hay-Packers, of which improvements the following is a full, clear, and exact description, which will enable others skilled in the art to which my invention appertains to make and use the said improvements, reference being had to the accompanying drawings, forming a part hereof, and in which—

Figure 1 is a top or plan view of a press embodying my invention; Fig. 2, a like representation, showing the interior of the press; Fig. 3, an end elevation; Fig. 4, a side elevation, and Fig. 5 an enlarged representation of the door-fastener.

Like letters of reference indicate like parts.

My object is to improve the construction and operation of horizontal baling-presses or hay-packers; and to that end my invention consists in the means employed for the purpose of driving the follower.

In the drawing, A represents the walls of the press or packer. These walls are constructed and arranged to inclose a long horizontal chamber, A'. The upper wall or cover is made in removable sections, having therein the hoppers B B and the deep cuts or slits $a$ $a$, arranged as shown. $a'$ $a'$ are also deep cuts or slits in the ends of the floor of the chamber A'. The ends of this chamber are closed by means of doors C C, consisting of vertical bars attached to a horizontal outer bar, $c$, and arranged apart from each other, as is clearly represented in Figs. 3 and 5. The bar $c$ projects beyond the side walls of the press, as shown, so that the doors may be conveniently and firmly fastened when closed, and be capable of being easily opened. The loops N N, pivoted to the sides of the press, and constructed and arranged to receive the projecting ends of the cross-bars $c$ $c$ and the cam-levers N' N', pivoted in the outer ends of the loops, will constitute a fastening suitable for this purpose. D is an elongated follower arranged in the chamber A', and extending laterally from wall to wall. This follower consists of the heads $e$ $e$, rigidly connected to each other by means of the pieces $e'$ $e'$. $e''$ $e''$ are vertical bars arranged on the outer ends of the heads $e$ $e$. The baling or packing chambers consist of those parts of the chamber A' through which the cuts or slits $a$ $a'$ extend, and the follower is of such a length that when one end reaches one of the packing-chambers the other end will be a considerable distance from the other packing-chamber, thus leaving, between the latter chamber and the follower, a space, into which the loose material may be thrown in order to be packed. Instead of thrusting the loose material in through the hoppers B B it may be fed through doors or chutes in the sides of the press, such doors or chutes being represented at B' B', Fig. 4.

I am aware that the parts now herein referred to have heretofore been employed in the construction of presses of this kind; but I have here described them with particularity, for the reason that I shall hereinafter have occasion to refer to them in connection with those features of construction which constitute the essential parts of my invention.

E is a horizontal frame, connected to the main part of the press. F is a vertical shaft, resting in bearings in the outer end of the frame E. G is a rag-wheel, rigidly mounted on the shaft F. H is a vertical double-crank shaft resting in bearings in the central part of the main part of the press. I is a rag-wheel, rigidly attached to the lower end of the shaft H. J is an endless chain, arranged over the wheels G and I. K is a draft bar or lever for actuating the shaft F. L is a pitman, carried by the shaft H, and pivoted to one of the heads of the follower D. The stroke of the pitman is such as to move the follower back and forth to the extent already stated. It is not essential, but preferable, that the frame E should extend to the main part of the press. Friction-pulleys and belts or ropes, or tumbling-rods and spurs, may be employed instead of the rag-wheels and endless chains. Any number of draft-levers may be used, and they should be removable in order to admit of compactness during transportation. The frame E may also be made in sections for the same purpose. The shaft H, however, may be driven by means of any power which may be convenient and practicable to employ. M M are cam-shaped springs, projecting from the walls of the chamber A', inwardly, at the inner ends of the packing-chambers. The walls are recessed to receive the free ends of the springs, which are bent at right angles, or nearly so, to the walls, as shown, thus presenting square shoulders to the material in the packing-chambers. The inclined faces of the springs are arranged to be struck by the follower as it moves toward the packing-chambers, thus causing the springs to recede from the chamber at the proper time.

The operation of the press or packer is as follows: A horse or team is hitched to the draft-lever and driven in a circle, as is usual in horse-powers of this class. By this means the follower is carried to the extent of its movement in one direction. A considerable space is thus left in one end of the chamber A', and as much hay or other material to be packed or baled is arranged in this space as may be conveniently fed through the hoppers or chutes. During the continued action of the power the follower is carried to the limit of its movement in the opposite direction. By this means the material already arranged in the press is pushed along by the follower and packed, being left in front of the springs in that end of the press toward which the follower last moved. A large space is thus left in that end of the press from which the follower last moved, and this space is then filled in the manner described. During the reverse movement of the follower the material last arranged in the press is packed or pressed into that end of the press toward which the follower then moves, and rests in front of the springs in that end. As the follower leaves the material first pressed the springs M M spring out laterally into the chamber A', and, by presenting square shoulders to the material in front of them, prevent the material from swelling out toward the follower as the latter recedes from it. The springs also tend to fold the hay at the corners of the bales.

The operation now described is continued until a sufficient amount of material is packed or pressed to form a bale. The power is then exerted on the bale to be tied, and the bales are tied and removed in the usual manner.

The press is portable, and may be mounted on a truck or not, as may be deemed desirable. It may also be made much smaller than many presses of its class differently constructed, and the amount of work capable of being performed with it in any given time will compare favorably with the capacity of much larger and more expensive constructions intended for the same purpose.

The material to be operated upon is fed into the press a forkful at a time, and is less liable to be injured than if a beater were employed to press a whole bale in one stroke. Less pressure is also required to produce each stroke.

I am aware that a double-headed follower arranged in the packing-chest has heretofore been driven alternately to the respective ends of the chest by means of a continuously-revolving shaft arranged between the heads of the follower, and provided with a cube operating alternately with the sections of a spiral drum, in combination with a lever for adjusting the sections, and with ropes or chains for communicating the reverse movement to the follower, a more particular description of which combination will be found in Letters Patent No. 57,227, issued to Edgar A. Ward, for improvements in hay-presses, and dated August 14, A. D. 1866, and I do not here claim the therein shown and described means for driving the follower; neither do I claim, broadly, the double-headed reversely-sliding follower; but

Having thus described my invention, what I claim as new, and desire to secure by Letters Patent, is—

The combination of the double-headed elongated follower D, chamber A', crank-shaft H, arranged in the said chamber and between the heads of the said follower, pitman L, and driving-gearing, all operating together substantially as and for the purposes specified, in a baling-press or hay-packer.

THOMAS J. CORNING.

Witnesses:
 N. C. GRIDLEY,
 F. F. WARNER.